O. A. WIRKKALA.
LOGGING SYSTEM.
APPLICATION FILED MAR. 10, 1914.

1,251,157.

Patented Dec. 25, 1917.
8 SHEETS—SHEET 1.

WITNESSES:
N. D. Haberlin
Vaino Anderson

INVENTOR
Oscar A. Wirkkala
BY
Peter Haberlin
ATTORNEY

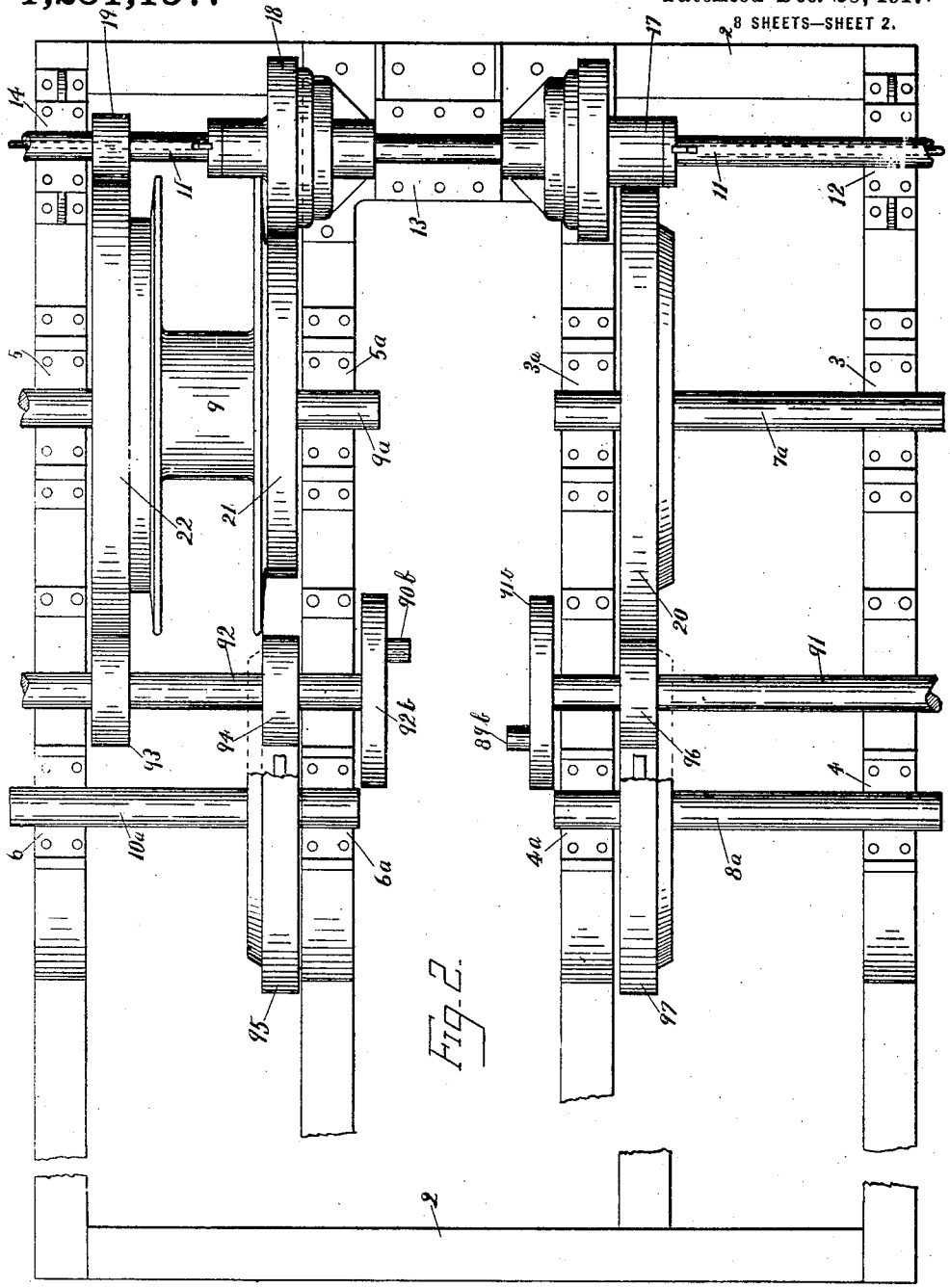

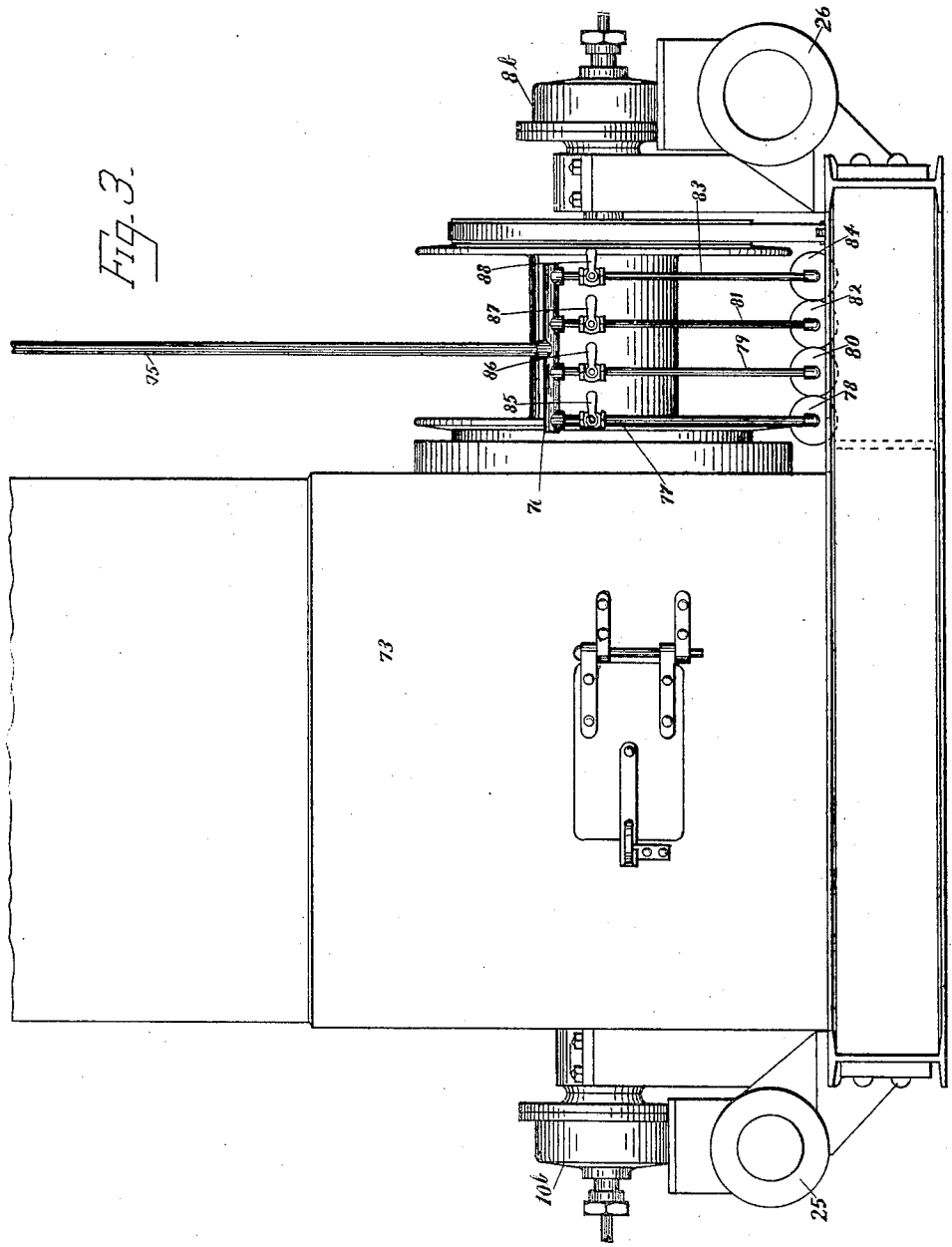

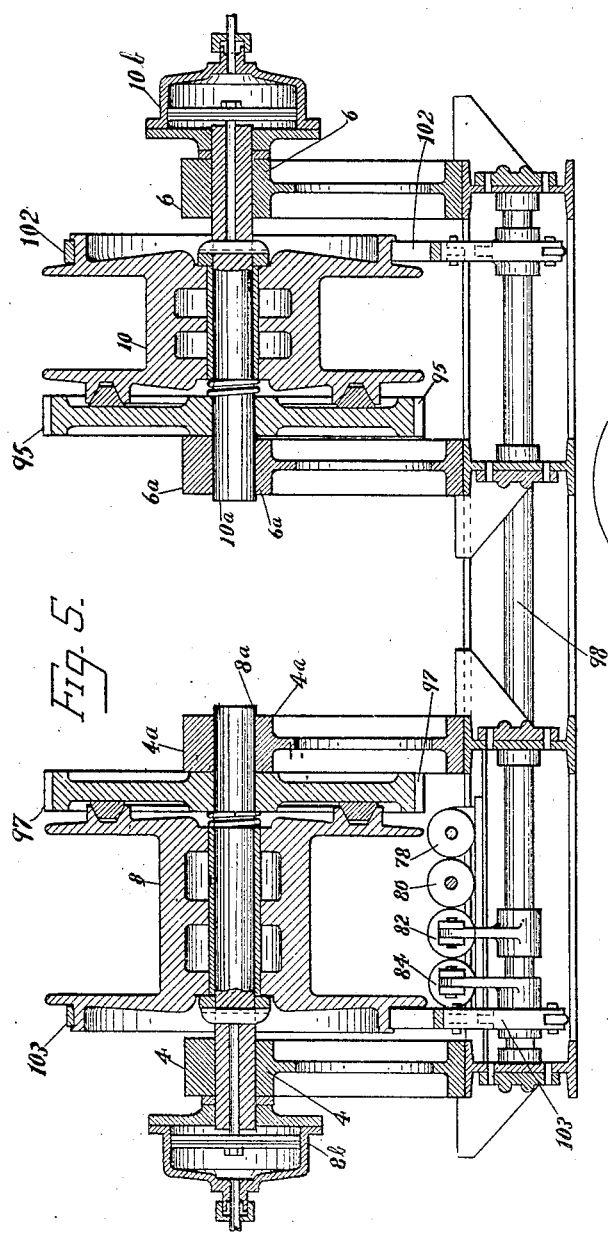
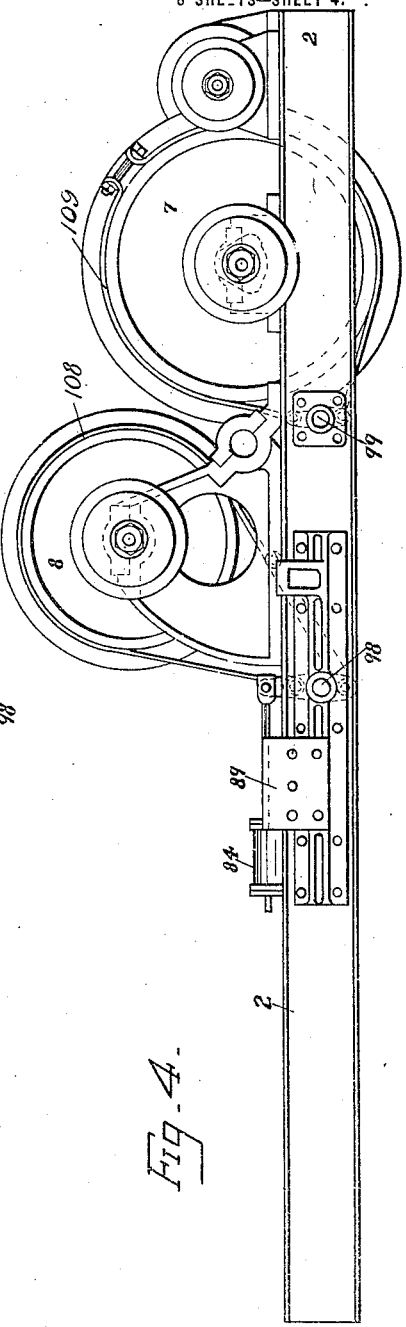

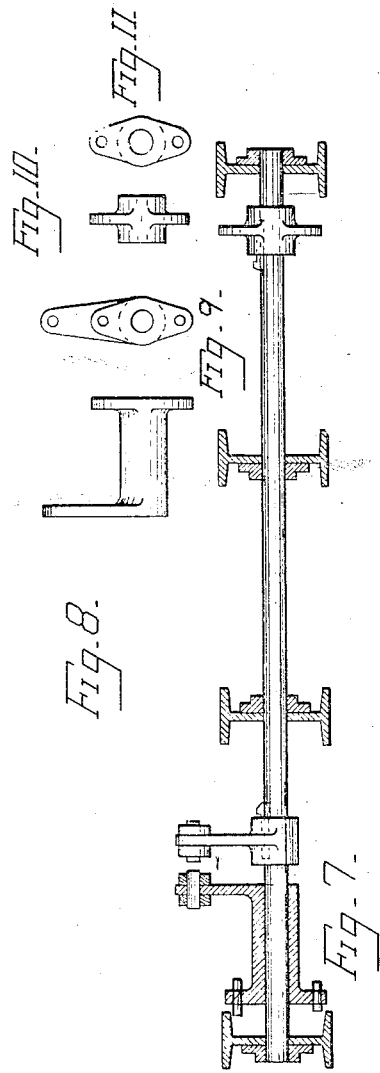
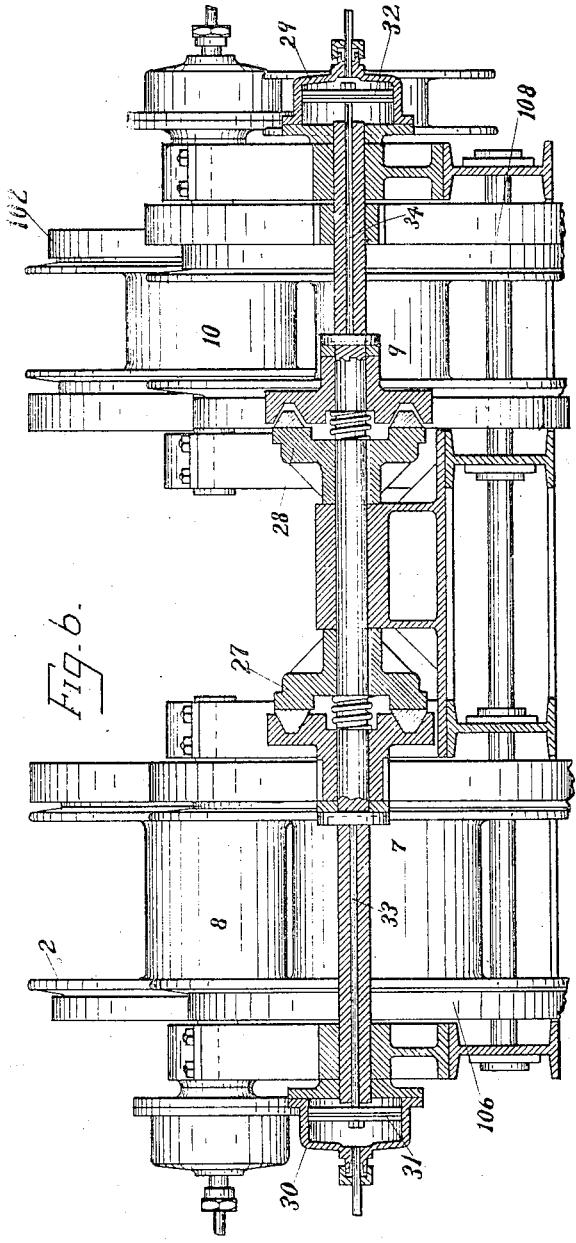

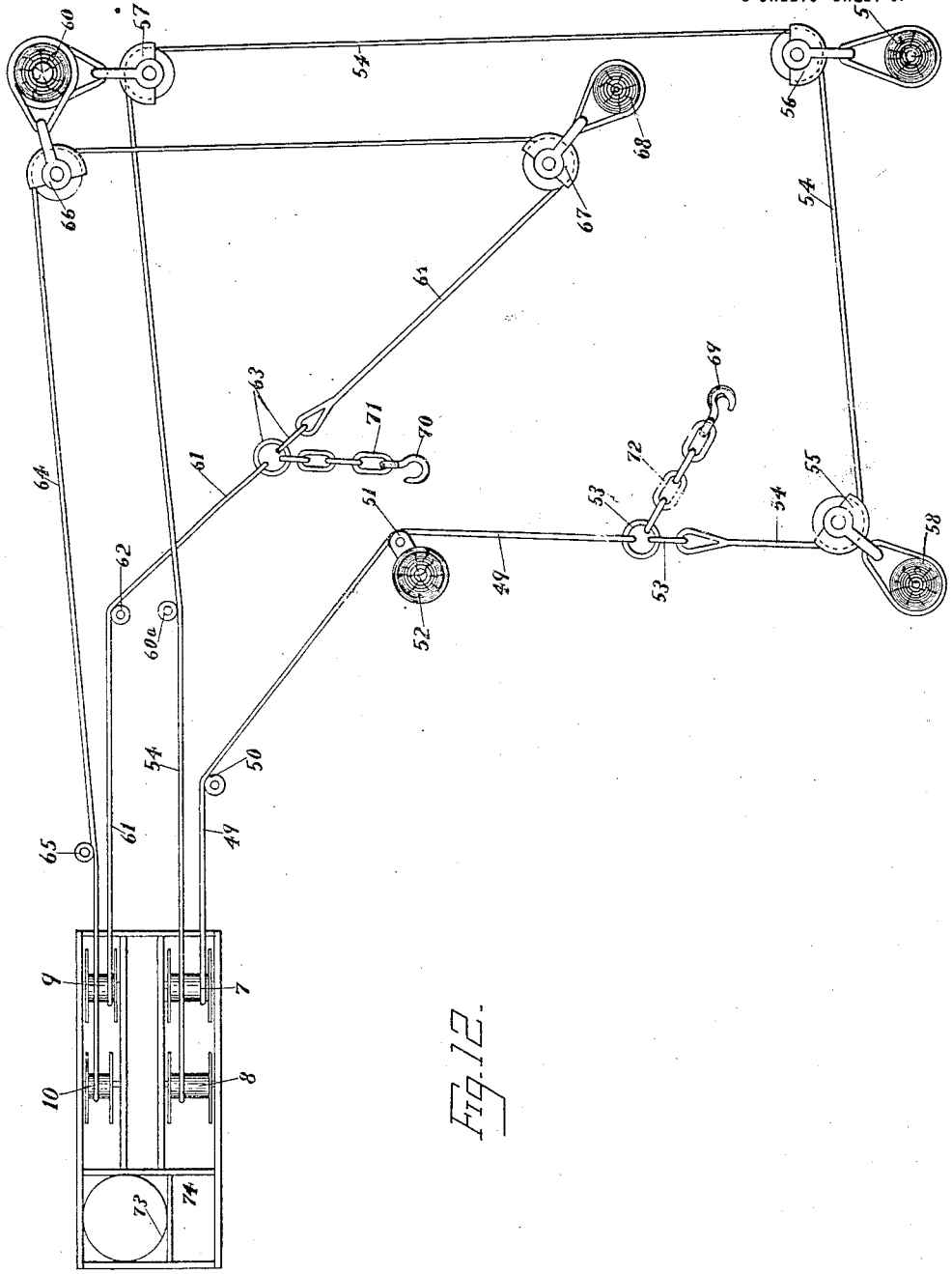

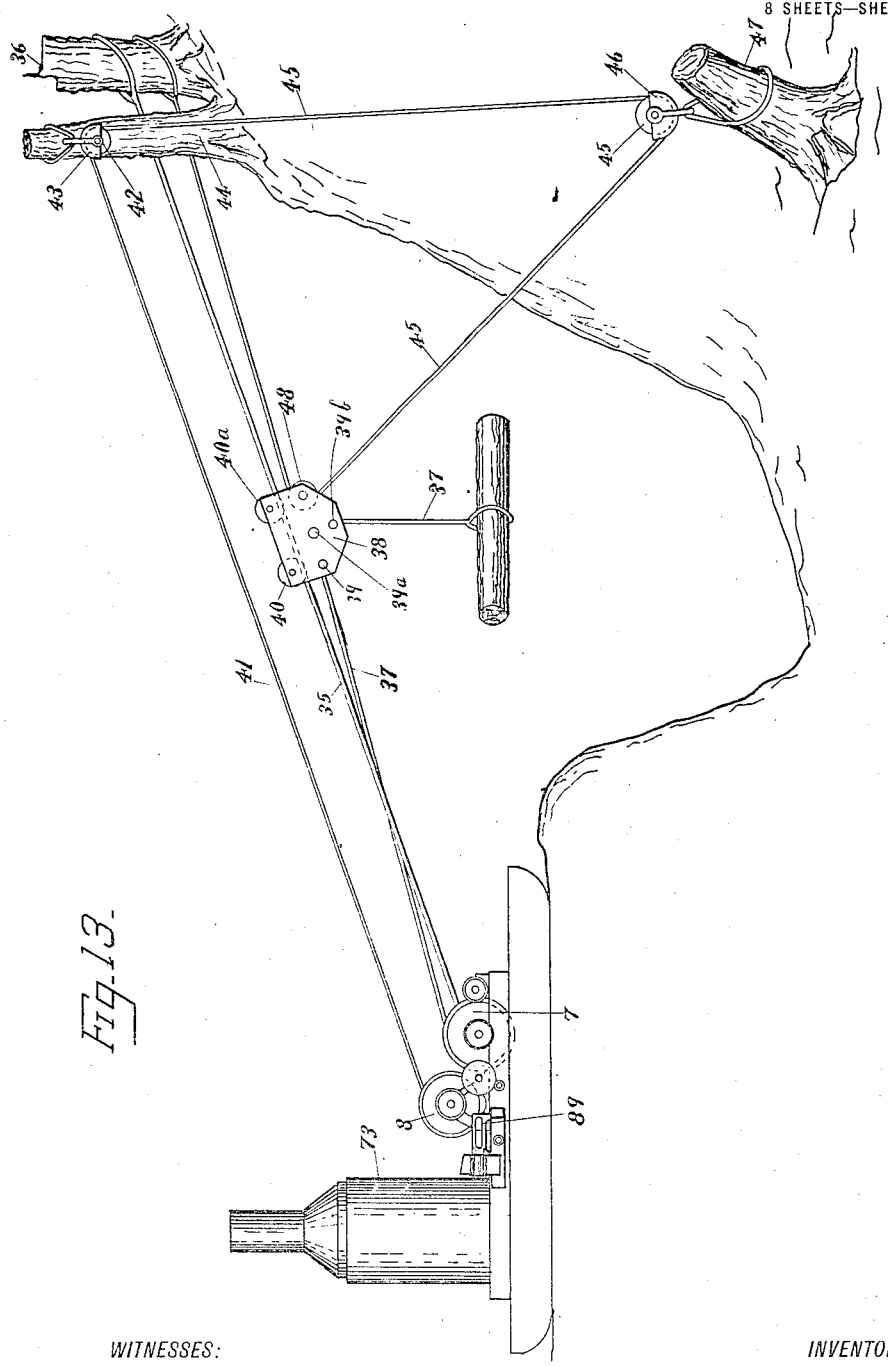

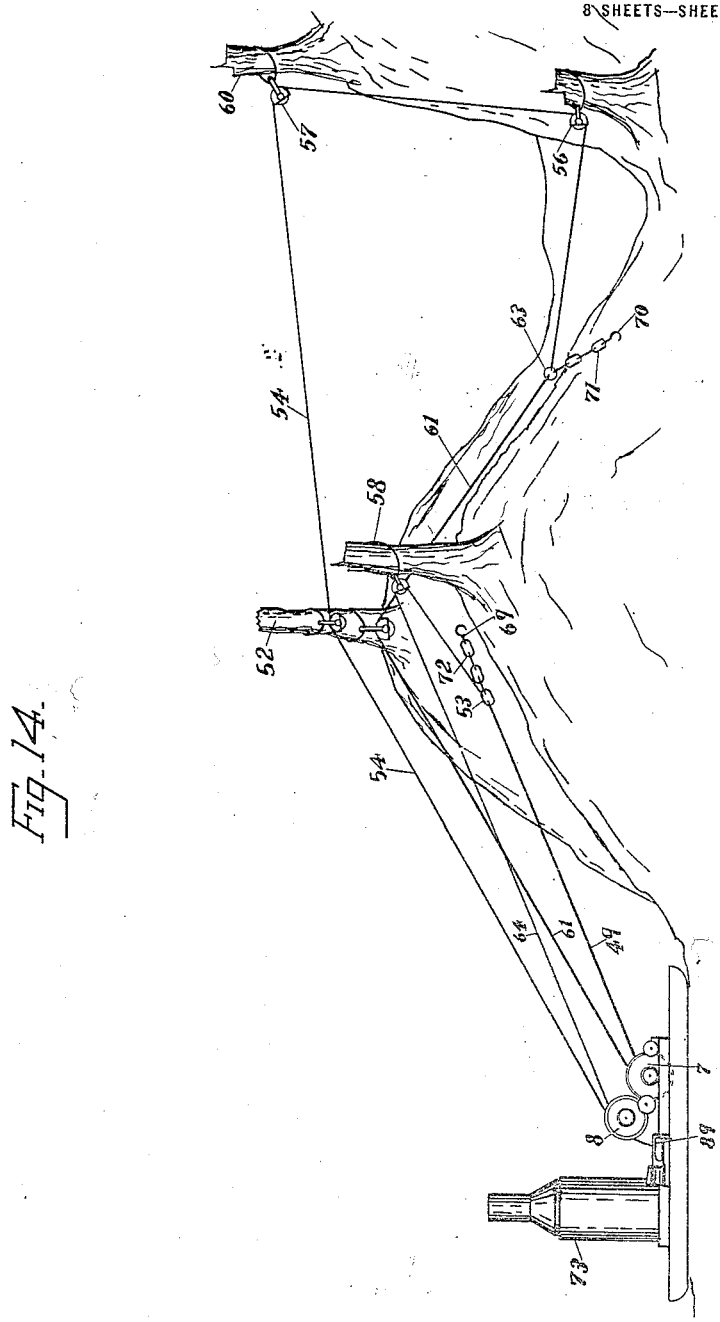

UNITED STATES PATENT OFFICE.

OSCAR A. WIRKKALA, OF KNAPPTON, WASHINGTON.

LOGGING SYSTEM.

1,251,157.  Specification of Letters Patent.  Patented Dec. 25, 1917.

Application filed March 10, 1914. Serial No. 823,675.

*To all whom it may concern:*

Be it known that I, OSCAR A. WIRKKALA, a citizen of the United States, residing at Knappton, in the county of Pacific and State of Washington, have invented certain new and useful Improvements in Logging Systems, of which the following is a specification.

My invention relates to a system of logging whereby two double-drum and double-cylinder engines are mounted on a common frame and operated by a single boiler; the drums adjacent the engines being mounted in bearings attached to frames which are built a considerable distance above the frame, while the drums remote from the engines are mounted in bearings which are in closer juxtaposition to the frame for purposes to be hereinafter described.

The object of my invention is to provide a system of this kind whereby each engine normally operates an upper and a lower drum; whereby each drum-shaft has a gear affixed thereto and each drum revolves freely on its shaft when normal, and is held in fixed relation thereto when engaged with friction devices placed intermediate said gears and drums, and further:—

To provide an auxiliary shaft at the front of the frame, (premising that the boiler is at the rear portion thereof) mounted in suitable bearings and controlling a pinion which engages the gear of the lower right-hand drum, and another pinion which engages the gear of the lower left-hand drum; the said auxiliary shaft also controls a clutch-gear which intermeshes with another gear which is bolted to said lower right-hand drum. These directions (right-hand and left-hand) are arbitrary, and are based on the premise that the spectator is facing the boiler.

With the foregoing and other useful objects in view, my invention consists of certain novel features of construction, combinations of elements and arrangements of parts to be hereinafter fully set forth and specifically claimed.

In order to fully comprehend my invention and the art to which it relates, reference must be made to the accompanying drawings, which taken in connection with the following specification, form part of this application.

Fig. 2 is a similar view partly broken away; the drums and bearing caps being removed;

Fig. 3 is an end elevation of Fig. 1;

Fig. 4 is a side elevation of same;

Fig. 5 is a section through line A A, Fig. 1;

Fig. 6 is a section through line B B, Fig. 1;

Fig. 7 is a side elevation of the brake-shaft and a vertical section of the bearings for same;

Figure 1:
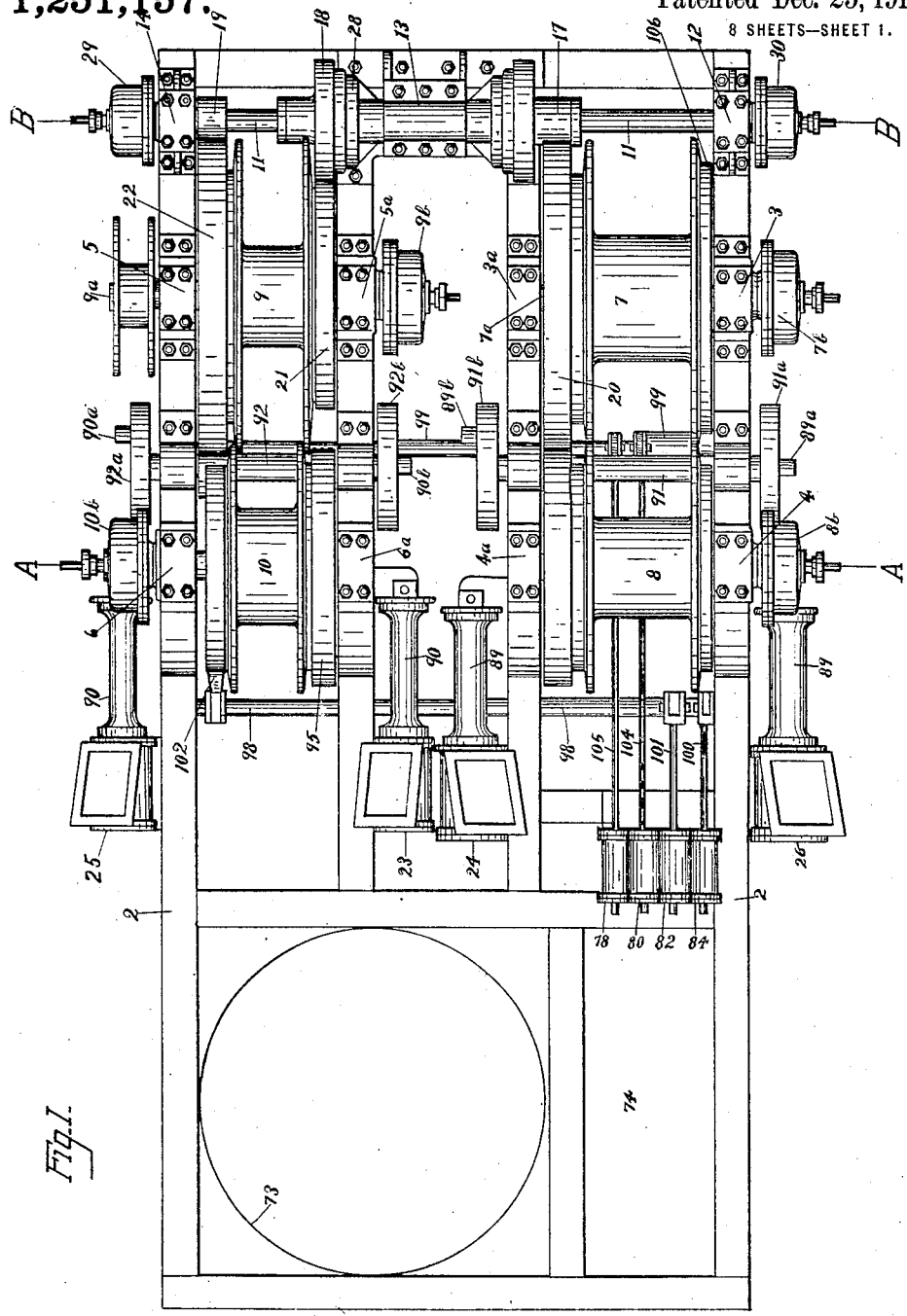
Figure 1 is a top plan view of my invention.

Figs. 8—9—10—11 are details;

Fig. 12 is a plan of the yarding system;

Fig. 13 is a side elevation of the aerial system, and

Fig. 14 is an elevation of said yarding system.

In the several figures of the drawings, like characters of reference indicate like parts, of which the numeral 2 indicates a frame or base plate to which are attached drum bearings 3—3ª; 4—4ª; 5—5ª, and 6—6ª. respectively;—said bearings 3—3ª support drum 7; 4—4ª support drum 8; 5—5ª support drum 9, while bearings 6—6ª support drum 10; said drums being revolubly mounted on transverse shafts 7ª—8ª—9ª—10ª respectively, and said shafts also carrying the steam-frictions 7ᵇ, 8ᵇ, 9ᵇ and 10ᵇ for purposes to be hereinafter described.

At the front of the base is a transverse auxiliary shaft 11, mounted in bearings 12, 13 and 14, and provided at its ends with steam frictions 29 and 30. This auxiliary shaft also has secured thereto a plurality of gears 17, 18 and 19, which mesh with gears 20, 21 and 22, respectively, said gears 20 and 22 being secured to their respective shafts, while gear 21, is secured to drum 9. Said auxiliary shaft 11, it will be noted, can be connected indirectly at three points to the drums 7 and 9, that is, from gear 17 to gear 20; from gear 18, to gear 21, and from gear 19, to gear 22, gears 20 and 22 being adapted to have the drums 7 and 9 frictionally locked thereto, at will, in the manner hereinafter described.

Mounted in the transverse central portion of base-plate 2, are two engine-cylinders 23 and 24; cylinder 23 being a counterpart of cylinder 25 which is mounted on the right-hand outer part of the base-plate, and cylinder 24 being a counterpart of cylinder 26, which is mounted at the outer left-hand side of said base-plate. Cylinders 24 and 26 serve to operate drums 7—8, while cylinders 23 and 25 operate drums 9—10.

Engines 24 and 26 are connected to and drive the shaft 91 through its crank wheels 91$^a$ and 91$^b$, to the crank pins 89$^a$ and 89$^b$ of which, said engines 26 and 24 are, respectively, connected. Said shaft 91 is provided with a pinion 96, Fig. 2, secured thereto and in mesh with gear 20, secured to shaft 7$^a$, on which drum 7 is movably mounted. Said pinion 96 also drives gear 97, secured to the shaft 8$^a$, on which the drum 8 is movably mounted, as will be clear from Figs. 1 and 2. Engines 25 and 23 drive shaft 92, by reason of their connections, respectively, with the crank pins 90$^a$ and 90$^b$, on the crank wheels 92$^a$ and 92$^b$, secured to said shaft 92. Said shaft 92 is provided with two pinions 93 and 94 secured thereto, the pinion 94 meshing with and driving a gear 95, secured to the shaft 10$^a$, on which the drum 10 is movably mounted, while the gear 93, meshes with and drives a gear 22, secured on the shaft 9$^a$, on which drum 9 is movably mounted. Said drum 9 has secured thereto, as a part thereof, a gear 21. Thus from engines 24 and 26, pinion 96, gear 97, to which drum 8 can be locked at will, gear 20, to which drum 7 can be locked at will, and the pinion 17, loosely mounted on the auxiliary shaft 11, are driven whenever said engines are operating. From engines 25 and 23, through shaft 92, pinion 94, gear 95, to which drum 10 can be locked at will, pinion 93, gear 22, to which drum 9 can be locked at will, and pinion 19, secured to the auxiliary shaft 11, and said auxiliary shaft 11, are all driven whenever said engines 25 and 23 are operating. Drum 9 is capable of being operated at two different speeds, that is, when friction clutch 29 is operated, the gear 18, loosely mounted on shaft 11, is locked to the friction clutch 28, secured to said shaft 11, and as said gear 18 is in mesh with the gear 21, formed as a part of drum 9, said drum 9 will be driven at high speed. When friction clutch 9$^b$ is operated, said drum 9 is locked to the gear 22, and is driven from the pinion 93, on the crank shaft 92, at low speed. To drive drum 8 from engines 24 and 26, it is only necessary to operate its friction clutch 8$^b$, which puts it in driving connection with the gear 97, driven from the pinion 96, see Fig. 2. If it is desired to add to this drum 8, the power of engines 25 and 23, then it is only necessary to close friction clutch 30, thus connecting engines 25 and 23, through their crank shaft 92, pinion 93, gear 22, pinion 19, shaft 11, pinion 17, which is locked to shaft 11 by said clutch 30, and gear 20. If it is desired to drive drum 7 from engines 24 and 26, it is only necessary to close friction clutch 7$^b$, which locks said drum 7, to its gear 20, which is being driven from the pinion 96, on the crank shaft 91. If it should be desired to add to this drum the power of engines 25 and 23, it is only necessary to close friction clutch 30, as before described, the drive from engines 25 and 23 to and through the shaft 11 being the same, pinion 17 being locked to the shaft 11 by said clutch 30. To drive drum 10 from engines 25 and 23, close friction clutch 10$^b$. If it is desired to add to this the power of engines 24 and 26, close the steam friction clutch 30, whereupon the drive from crank shaft 91, of said engines 24 and 26, is transmitted through the pinion 96, gear 20, pinion 17, now locked to the shaft 11 by steam friction clutch 30, pinion 19, gear 22, pinion 93, shaft 92, pinion 94 and gear 95, to which said drum 10 is locked. Drum 9 can be driven from engines 25 and 23 by operating the steam friction clutch 9$^b$, which locks it to gear 22, driven from the pinion 93, thus driving it at low speed. If it is desired to drive drum 9 at high speed, steam friction clutch 29 is operated, which locks gear 18, to the shaft 11, said gear 18 driving said drum through its gear 21. The power of engines 24 and 26 can be added to said drum 9 by the closing of the steam friction clutch 30, as before. When engines 25 and 23 are operated, the shaft 11 is always driven by reason of the connection of its pinion 19 with the gear 22, which meshes with the pinion 93 on the crank shaft of the engine. When engines 24 and 26 are operated, the shaft 11 is not driven from these engines unless the steam friction clutch 30 is operated so as to lock pinion 17 to said shaft 11.

Thus by means of the train of gears from each of the engines to the auxiliary shaft 11, all of the power of all of the engines may be connected up to any one drum, when required by an unusual load thereon.

The means of piping the steam-frictions and engines from the boiler are old in the art and need not here be described in detail, particularly as they form no part of the present invention. The mode of operating said engines and steam-frictions is also old, and therefore will only be referred to casually, hereinafter.

In Fig. 12 is shown a form of rigging used in connection with the above described arrangements of engines and drums, known in loggers' parlance as a "yarding system," while Fig. 13 illustrates a form of rigging known in the art as a "sky-line," or an "aerial system." These systems in connection with the novel structure of the auxiliary shaft and parts attached thereto, form the subject matter of the broad claims of this invention.

In Fig. 13, the numeral 25 designates an aerial line, or cable which encircles drum 7, and the free end of which is extended over a gap as shown, and is anchored to a stump 36, this cable is adapted to be drawn tight as in the illustration, or slackened when so desired for the purpose of lowering choker-line 37 into the gap; said cable 37 being fixed to block 38 at points 39—39ᵃ—39ᵇ, and said block being supported on cable 35 by means of sheaves 40—40ᵃ. A trip-line 41 encircles drum 10 from whence it passes outwardly and over sheave 42 of block 43, which is anchored at stump 44, thence downwardly and over sheave 45 of block 46 which is anchored at stump 47; the free end of this line then passes obliquely upward and over sheave 48 which is revolubly mounted intermediate the walls, or side-frames of block 38, from whence it is made fast to the lower part of stump 36.

The choker-line 37 encircles drum 9 and passes through block 38 from whence it passes downwardly to a convenient distance, and the portion held intermediate the walls of said block is firmly fixed thereto. The free end of said choker-line may have attached thereto a device known in the art as a "choker-hook," or it may have other convenient means to immediately and securely hold or release a log, at the will of the operator. The choker-line will hold the log fast while there is a pulling strain on trip-line 45, but when the strain is released and said trip-line is slackened, the means that hold said log in fixed relation to said choker-line releases, and allows the log to drop into a position predetermined by the operator.

With all of the lines attached as above described, and all of said lines released from their respective drums, the block 38 will be lowered into the gap until it is placed adjacent the log to be attached to the choker-line; when said log is so attached, the lines are then tightened by means of power applied to the drums by the engines, the block 38 is drawn to a position immediately above the place where the log is to be deposited, and again lowered to release said log. These operations are repeated until the desired number of logs are removed. Drum 8 is not used in the "aerial system."

Having given a brief description of the operation of the "aerial system" in connection with the controlling means for same, the following will suffice to describe the "yarding system" and its operation.

Now referring to Figs. 12 and 14, a main-line 49 passes from drum 7, over road-spool 50 and through block 51 which is anchored to stump 52;—the free end of said main-line is then fastened to rings or other convenient means such as 53, which also connect to trip-line 54 which passes from said rings to blocks 55—56—57 which are securely anchored at stumps 58—59—60; the trip-line then encircles drum 8 which operates same. The road-spool 60ᵃ guides said trip-line.

Another main-line 61 passes from drum 9 to road-spool 62 and from thence in an oblique direction where it connects to rings 63 in the same manner as main-line 49. A trip-line 64 passes from drum 10 and contacts with road-spool 65, from whence it passes outwardly to blocks 66—67 which are anchored to stumps 68—69 respectively. The butt-hooks 69—70 attached to chains 71—72 are passed around the logs and attached to rings 53 and 63, when it is desired to haul the logs, and released therefrom when said logs are hauled in predetermined places by the main-lines. Both of these trip-lines serve to pull the main-lines into the woods, while drums 7 and 9 haul the logs along the ground toward the engines.

Both the yarding and aerial systems are rigged to haul logs to the right or left of the engine, and when one side is logged, the rigging is shifted to the other side and logs removed in the manner above described.

With my improved logging systems, it is possible to log timber from 480 acres of land without moving the engines from a fixed position.

Premising that boiler 73 has a fire-box of the oblong type 72″x132″; that drums 7 and 8 are operated by 12″x11″ cylinders and drums 9 and 10 operated by 10½″x11″ cylinders; that drum 7 has a capacity for 2800 feet of 1″ cable; drum 8 a capacity for 8000 feet of ⁷⁄₁₆″ cable, and drum 10 a capacity for 3500 feet of ⅝″ cable, and that drum 7 is 2′ 6″ in diameter, a speed of 2356.2 feet per minute could be attained by block 38 on aerial-line 35. This speed is based on the premise that drum 7 has a speed of 300 revolutions per minute, which multiplied by pi by 2′ 6″ equals 2356.2 feet, the speed that the log travels on the aerial line. By proper manipulation of the clutches, gears and auxiliary shaft, the engine will run on a slow speed, and thereby be very powerful.

In the rigging illustrated in Fig. 12, the four drums are brought into action, and while drum 7 is operating the long main-line 49, which is 2800 feet in length, the drum 8, pulls out said main-line by means of the long trip-line 54, which is 8000 feet in length. Working simultaneously with the long main-line is the short main-line 61, which is 2600 feet in length and operated by drum 9, while the trip-line 64 is pulling out said short main-line 61; the trip-line being 5500 feet in length and operated by drum 10.

When the operator takes his place on platform 74, he operates the throttles, (not shown) which allow the steam from boiler 73 to operate the engines. In view of the fact that the piping from said boiler to the engines is arranged in the conventional manner, a description and illustration is not deemed necessary in this specification, but I have shown in Fig. 3, a diagram of the steam pipes which lead from boiler 73 to the steam brakes and the valves that operate same. The following brief description will suffice to explain the same:—

Main steam-pipe 75 is attached to any suitable place on the boiler, from whence it passes downwardly to manifold 76, while pipe 77 passes from said manifold to brake-cylinder 78; pipe 79 passes to brake-cylinder 80; pipe 81 to brake-cylinder 82 and pipe 83 connects with brake-cylinder 84. The steam is allowed to pass into these brake-cylinders through the medium of valves 85—86—87 and 88 respectively.

The means of connecting engines 89 with crank-pins 89ª—89ᵇ, and engines 90 with crank-pins 90ª—90ᵇ are not shown, but are well known in the art and form no part of the invention. When said connections are made, crank-pins 89ª—89ᵇ drive crank-shaft 91 through the medium of cranks 91ª—91ᵇ, while crank-pins 90ª—90ᵇ drive crank-shaft 92 through the medium of cranks 92ª—92ᵇ. Mounted on said crank-shaft 92 are pinions 93—94, which intermesh with gears 22 and 95, while a single pinion 96, is attached to crank-shaft 91; said pinion intermeshing with gear 97.

Passing transversely of base-plate 2 are brake-shafts 98—99 (Fig. 1); the brake-levers 100—101 being attached to brake-shaft 98 for the purpose of operating brake-band 102 of drum 10, (Figs. 1 and 5), and brake-band 103 (Fig. 5) of drum 8, while brake-levers 104—105 connect to brake-shaft 99; the brake-lever 104 operating brake-band 109 of drum 7, and brake-lever 105 operating brake band 108 of drum 9 (Fig. 4).

By the use of the brake-cylinders and other operating mechanisms above described, one man can operate the engines, while another man in the woods gives the proper signals to said operator.

My invention may be constructed of any material and made any size deemed suitable for all the requirements of such a machine, and while I have illustrated and described a preferred form of mechanism, and combinations of elements considered essential in materializing the same, I wish to include in this application, all mechanical equivalents and substitutes that may be fairly considered to lie within the scope and purview of the invention as defined in the appended claims.

Having thus fully described my invention so that others skilled in the art to which it relates may be enabled to construct and use the same, what I claim and desire to secure by Letters Patent, is:—

1. An apparatus of the character referred to, comprising in combination, a plurality of pairs of cable drums, shafts upon which said drums are mounted, said shafts being provided with friction gears, means for moving said drums into frictional driving engagement with the friction gears on said shafts, a source of steam supply with a plurality of engines for driving said drums, driving connections from said engines, whereby said drums can be driven independently or simultaneously, and means whereby all of said engines can be put into driving connection with one of said drums, substantially as described.

2. A four-drum, four-cylinder, engine with driving connections from said engines to said drums, whereby said drums can be driven together simultaneously, or each independently of the others, and means for connecting all of said engines on to one drum, substantially as described.

3. A four-drum, four-cylinder engine with driving connections from said engines to said drums for driving them together simultaneously, or each independently of the others, a clutch mechanism for moving each of said drums into its driving position, and means for connecting all of said engines with one of said drums, at will, substantially as shown and described.

4. In a logging system controlled by a four-drum, four-cylinder engine mounted on a common base-plate, an auxiliary shaft attached to the front of the base-plate, a plurality of pinions mounted on said shaft, two of said pinions being operated by friction-clutches, said friction-clutches being actuated by steam power, said pinions being adapted to throw the power of both engines into either of the drums when desired, for the purposes set forth.

5. In a logging system controlled by a four-drum, four-cylinder engine mounted on a base plate, an auxiliary shaft mounted on said base-plate, a plurality of pinions mounted on said shaft, two of said pinions being held in fixed relation to a shaft when engaged by steam-frictions, said steam-frictions being fixed to the shaft, said pinions being adapted to throw the power of both engines into one of the drums for purposes of high speed in returning the aerial line, substantially as set forth.

6. In an engine-controlled logging system, a plurality of drums driven by two-cylinder engines through the medium of gearing, an auxiliary shaft, a pinion fixed to said shaft, said pinion engaging a gear attached to the lower right-hand drum, clutch-gears also mounted on said shaft, one of said clutch gears engaging a gear at the left of said drum and the other engaging a gear on the lower left-hand drum, said clutch-gears being feathered to the shaft and brought in engagement with the drum gears by steam-frictions, said steam-frictions being fixed at each end of the shaft, for the purposes set forth.

7. In an apparatus of the character referred to, a plurality of engines, a train of gears for each engine with driving connections therewith, a plurality of drums for each train of gears with means for locking the same thereto at will, and driving connections for connecting said trains of gears together at will, whereby the gears of all trains can be driven from either or all of said engines.

8. In an apparatus of the character described, in combination, two engines, a train of gears for each engine with driving connections therewith, a pair of drums adapted to be moved into and out of driving connections with gears of each train, means for operating the same at will, driving connections for connecting said two trains of gears at will, whereby both trains of gears can be driven from either or both of said engines, substantially as and for the purpose described.

9. In an apparatus of the character referred to, in combination, a boiler, two steam engines connected to be operated therefrom, a pair of drums for each engine, means for connecting said drums to be driven from said engines at will, and driving connections from one engine to the other, whereby both engines can be connected at will to any one of said drums, and means for operating said connections at will, substantially as described.

10. In an apparatus of the character described, in combination, a boiler, two steam engines connected for operation therewith, two gears, connected to be driven from each of said engines, a drum for each of said gears, clutch mechanisms for connecting said drums, respectively, to said gears, an auxiliary connecting shaft adapted to be put into driving connection with the gears of both of said engines, whereby the gears driven by both of said engines may be connected together for the purpose of connecting both engines to all of said gears, and to any one of said drums, substantially as described.

In testimony that I claim the foregoing as my own, I hereunto affix my signature in the presence of two witnesses.

OSCAR A. WIRKKALA.

Witnesses:
ANDREW ANDERSON,
PETER HABERLIN.